June 19, 1956　　　H. L. ANDERSON　　　2,751,505
NEUTRONIC REACTOR DEVICE
Filed Dec. 29, 1948　　　2 Sheets-Sheet 1

INVENTOR.
Herbert L. Anderson
BY
Roland A. Anderson
Attorney

June 19, 1956 H. L. ANDERSON 2,751,505
NEUTRONIC REACTOR DEVICE
Filed Dec. 29, 1948 2 Sheets—Sheet 2

INVENTOR.
Herbert L. Anderson
BY
Roland A. Anderson
Attorney

United States Patent Office 2,751,505
Patented June 19, 1956

2,751,505
NEUTRONIC REACTOR DEVICE

Herbert L. Anderson, Chicago, Ill., assignor to the United States of America as represented by the United States Atomic Energy Commission Application December 29, 1948, Serial No. 67,811

14 Claims. (Cl. 250—83.1)

This invention relates to a means and method of continuously recording the instantaneous power output level of a neutronic chain reactor. There is also provided by the invention a novel device for continuous bombardment of materials with nuclear particles and radiations.

The most practical accurate general method for the measurement of neutronic reactor power output is the measurement of the neutron flux, which is in general proportional to the power level of operation. Other methods, which are based upon such indicia of power level as temperature of the coolant or of some portion of the reactor, are reliant for their accuracy on such external factors as constancy of the pumping rate of the coolant, ambient temperature, and temperature of the coolant before entering the reactor. Equipment for the practice of such methods with accuracy is highly complex.

The most common method of continuously recording neutron flux in a chain reactor heretofore in use employs an ionization chamber which is sensitive to neutrons. A common form of such ionization chamber employs the isotope $B^{10}$ as a neutron detector. The alpha particle emitted when this isotope of boron absorbs a neutron causes ionization current in the chamber. The difficulty with this method is that such a system cannot discriminate completely against gamma rays. Since the gamma-ray activity of the reactor, unlike the neutron flux, takes a long time to build up and to die away in following the power level, such a device is not capable of responding quickly and completely to abrupt changes of the power level; the instantaneous reading obtained from such a device is to some extent dependent upon the prior history of operation of the reactor.

Figure 1:
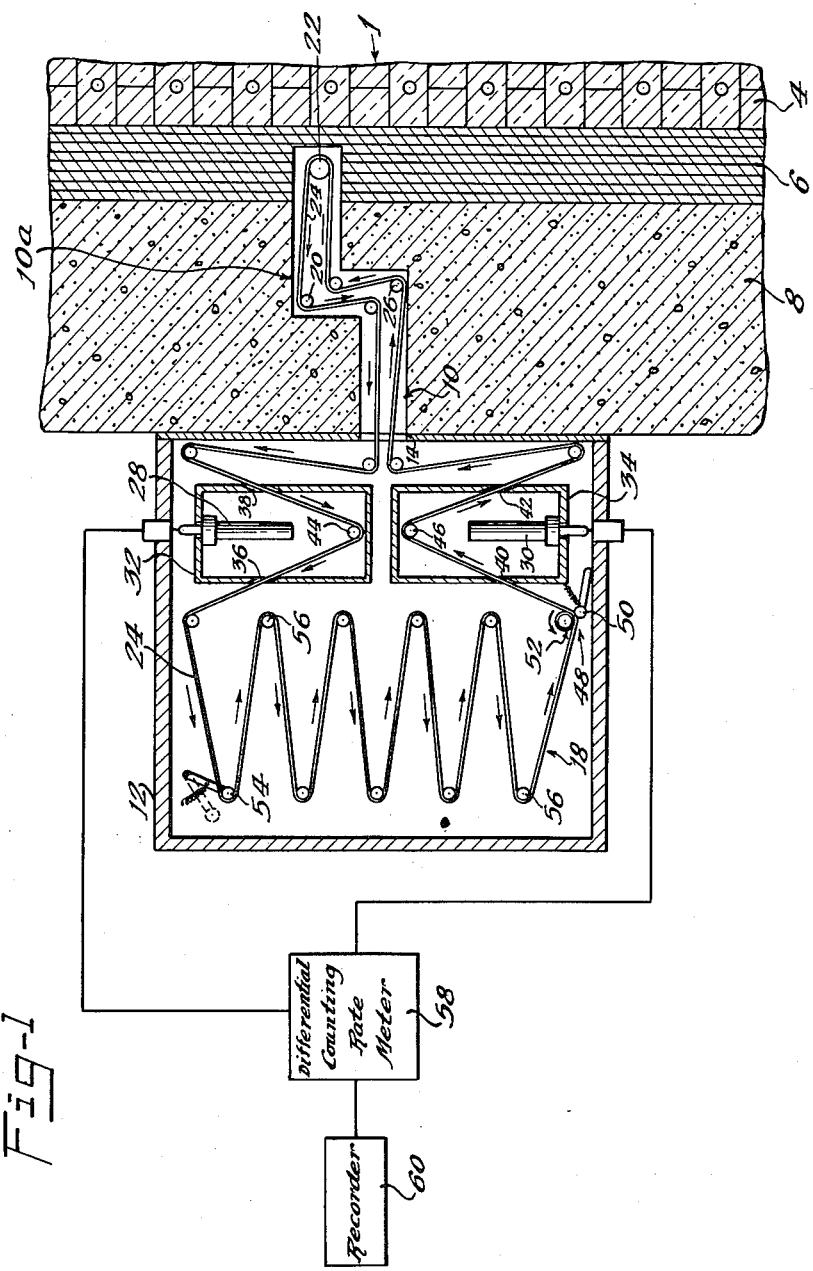
Figure 2:
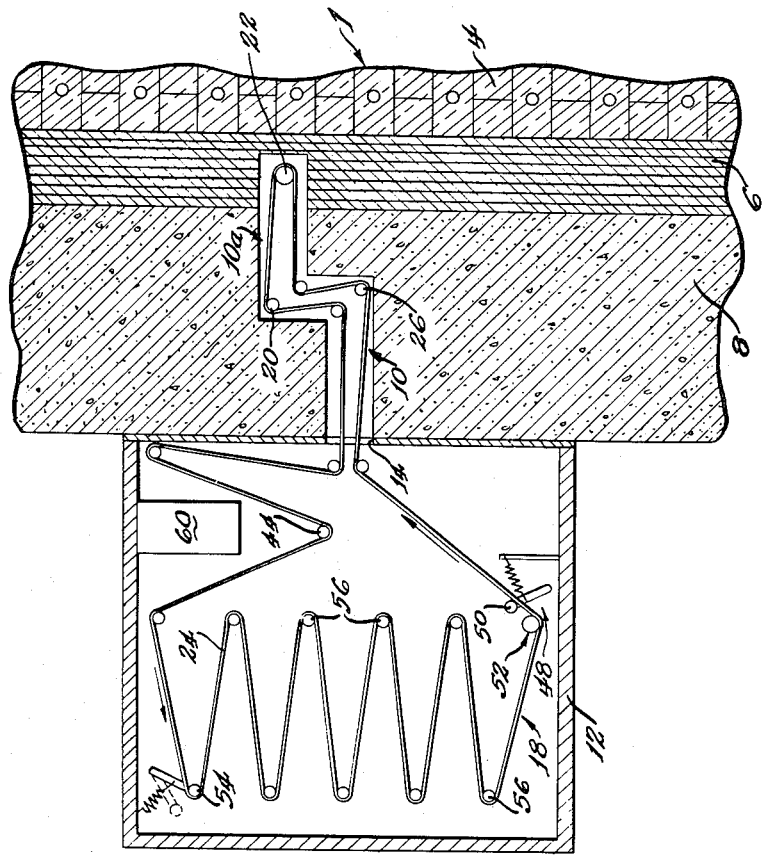

It is the principal object of the present invention to provide an improved method and apparatus for the continuous recording of the neutron flux, and thus the power output level, of a neutronic chain reactor. As will be seen hereinafter, there is also provided by the invention an improved method and apparatus for the continuous bombardment of materials with nuclear particles and radiations. Other aims and objects of the invention will be apparent from the description below and from the drawings, illustrating the invention, in which:

Figure 1 illustrates schematically a fragmentary vertical sectional view of a neutronic chain reactor, a continuous tape passing therethrough, and, mounted on the reactor, an elementary form of mechanism for transporting the continuous tape and for measuring and recording its radioactivity; and Figure 2 is a schematic view illustrating the present invention in the form of a device for irradiating materials.

Referring to the Figure 1, the numeral 1 designates generally a neutronic chain reactor. The features and operation of the neutronic chain reactor form no part of the present invention and therefore the details thereof are not illustrated or described herein, except as material to the present invention. It will be seen that the invention is applicable to any type of neutronic reactor. For example, the invention is applicable to the reactors described in the application of Enrico Fermi and Leo Szilard, Serial No. 568,904, filed December 19, 1944, now Patent No. 2,708,656, issued May 17, 1955.

For purposes of the present invention the chain reactor 1 may be deemed to comprise merely an active portion or core 4, a neutron reflector 6 and a biological shield 8. In the active portion or core 4, a self-sustaining neutronic chain reaction takes place, a fissionable material being distributed in suitable fashion within this active portion 4. The reflector 6 surrounds the active portion 4 and acts to reflect a portion of the neutrons escaping from the active portion 4, thus preventing the loss of such neutrons to the sustaining of the chain reaction. The biological shield 8 acts to absorb a sufficient proportion of the particles and radiations escaping from the active portion 4 to render the vicinity exterior to the reactor 1 safe for personnel.

A passage 10, having an offset portion 10a, extends from the face of the chain reactor 1, through the biological shield 8 and into the reflector 6. The offset is provided so that there is no direct path for particles and radiations from the active portion 4 to the exterior.

Mounted on the exterior face of the chain reactor 1 is a box-like container 12 of brass, having an aperture 14 coinciding with passage 10. Mounted within container 12 is a train of pulleys collectively designated by the numeral 18. Since the design and construction of the pulley train in itself constitutes no part of the present invention, the pulleys 18 are shown more or less schematically in the drawing, and a merely elementary pulley system is illustrated and described below.

Also contained within container 12 are Geiger counters 28 and 30. Each of the Geiger counters 28, 30 is enclosed in a lead shield 32, 34 adapted to shield the interior thereof from exterior radiation. The Geiger counters 28 and 30 are mounted to the shields 32 and 34. Each of the shields 32, 34 has a pair of oppositely disposed apertures 36, 38, 40, 42 and each of the shields 32, 34 has mounted therein a pulley 44, 46 adapted to guide a continuous tape 24, subsequently to be described, around the respective Geiger counter 28, 30, pulleys 44 and 46 being part of pulley train 18.

A continuous wire or tape 24, for example 400 feet long, ⅝ inch wide and .005 inch thick, preferably of silver, is threaded in endless fashion through the pulley train 18 contained in container 12, and the pulleys 20, 22 and 26 contained in passage 10. The tape 24 is continuously driven at a constant speed by a power drive generally designated by numeral 48, comprising a pressure wheel 50 and a rubber-covered drive-wheel 52, which is driven by exterior motor means (not shown). The direction of motion of the tape 24 as indicated by arrows in the drawing. In the elementary system of the drawing, tension of the tape 24 is maintained by the spring-and-pivot mounting of the pulley 54.

The operation of the particular embodiment of the invention illustrated in the drawing may best be explained by following the path of an arbitrarily selected point or portion of the tape 24 as it moves through the system. Consider a short portion of the tape 24 entering the passage 10 through the aperture 14. The portion travels through the biological shield 8 in the passage 10 until it reaches the point of offset, at which point it is guided by pulleys 26 into the offset portion 10a, wherein it continues to travel until it leaves the biological shield 8 and enters the reflector 6. While in the reflector 6, the portion of the tape 24 is subjected to bombardment by neutrons from the active portion 4 of the reactor 1.

The tape 24 may be of any material in which neutron bombardment produces radioactivity of relatively short half-life, such as indium or copper. However, the tape 24 is preferably of silver, which in nature consists of two isotopes, $_{47}Ag^{107}$ and $_{47}Ag^{109}$, in approximately equal proportions. When the tape 24 is subjected to an atmosphere of neutrons such as that present in the chain reactor 1, a portion of the atoms of both isotopes absorb neutrons and become radioactive. As to both isotopes, the number of atoms so transmuted in any given time of exposure to the neutron flux is proportional to the density of the neutron flux, and thus to the level of operation of the reactor at the time of exposure. The isotope $_{47}Ag^{107}$ becomes the radioactive isotope $_{47}Ag^{108}$, which has a half-life of 2.3 minutes, and the isotope $_{47}Ag^{109}$ becomes the radioactive isotope $_{47}Ag^{110}$, which has a half-life of 22 seconds. As is well known in the art, the half-life is descriptive of the speed of decay of the radioactivity, which is exponential in time. The half-life is defined as the time in which the radioactivity decays by a factor of one-half. Thus, making the simplifying assumption of instantaneous exposure, the radioactivity of $_{47}Ag^{110}$ has decayed to one-half of its original value 22 seconds after exposure, to one-fourth after 44 seconds, to one-eighth after 66 seconds, and so on.

The portion of the tape 24 which is thus exposed to neutron flux and rendered radioactive by transmutation of some of the atoms therein while in the reactor, is returned to container 12 over pulleys 22, 20 and 26, enters the shield 32 through aperture 38, is guided past the Geiger counter 28 by pulley 44, and leaves the shield 32. The time which elapses between entry into the reactor and exposure to the Geiger counter is very short, for example 2 seconds. It is then guided over a long series of pulleys 56, so that it is in effect stored for a period very long relative to the time spent in the reactor 1 and relative to the 22 second half-life of $_{47}Ag^{108}$. The storage period is more than ten times the 22 second half-life, for example 5 minutes. During this storage period, the radioactivity due to the 22 second half-life becomes negligible. However, there remains a large portion of the 2.3 minute half-life radioactivity of $_{47}Ag^{108}$. The portion of the tape under consideration then enters shield 34 through aperture 40, is guided past the Geiger counter 30 by pulley 46, leaves the shield 34, and re-enters passage 10 through aperture 14, thus continuously repeating the cycle.

Both Geiger counters 28 and 30 are connected to a differential counting-rate meter 58. Since the exact form of differential counting-rate meter 58 is not material to this invention, and since persons skilled in the art of radioactivity instrumentation are familiar with such apparatus, the differential counting-rate meter 58 is designated in the drawing merely in block form. The differential counting-rate meter 58 serves to measure continuously the counting-rate of each of the Geiger counters 28 and 32, and to measure continuously the differential between said counting rates. The differential is recorded by means of a recorder 60, likewise shown in the drawing in block form.

Geiger counter 30 counts the radioactivity of the tape 24 on leaving the storage pulleys 56, before entering the reactor. This radioactivity is due to the 2.3 minute half-life, the 22 second half-life radioactivity having for practical purposes disappeared during the period of storage on pulleys 56. The time spent in the cycle by any given point on the tape 24 in entering the reactor, travelling into the reactor and out again through passage 10, into shield 32 and around Geiger counter 28 is small compared with the 2.3 minute half-life. Thus the activity which is counted by the Geiger counter 30 just before the given portion of the tape 24 enters the reactor remains almost completely and is again counted by Geiger counter 28 just after the given portion leaves the reactor. On this activity there is superimposed the activity induced by the new exposure to neutron flux in the reactor. Meanwhile, the activity to which the counter 30 is exposed (i. e., the activity of a closely following portion of the tape) will be substantially unchanged in amount because of the brevity of the time lag. Thus the difference between the counting rates of the Geiger counters 28 and 30 at any time is a close measure of the level of operation of the reactor at that time.

If the pulley train 18 is made with the series of storage pulleys 56 sufficiently long so that the period of storage is long compared with the half-life of any of the induced radioactivity, Geiger counter 30 and the differential arrangement illustrated are not needed, the counting rate of Geiger counter 28 constituting a measure of the operating level. But the use of Geiger counter 30 and differential counting-rate meter 58 allows a great reduction in the required period of storage and therefore in the length of tape 24 required and in the complexity of pulley train 18 which would otherwise be necessary to prevent the measurement of the level of operation from being unduly influenced by the intensity level which existed in previous cycles of the tape.

Silver has, in addition to the magnitudes of the half-lives of its induced radioactivity, the additional important advantage of not being rendered radioactive by gamma rays. Gamma-ray intensity in the reactor, unlike neutron intensity does not quickly follow changes in the level of operation. In addition, the amount of gamma radiation present in the reactor is very great. Thus if an element which is rendered radioactive by gamma rays is used as the material of tape 24, the measurements are not as accurate.

Figure 2 illustrates the present invention in the form of an apparatus for the bombardment of materials with nuclear particles and radiations. In this figure, the elements which are identical with the elements shown in Figure 1 have been designated by the same reference numerals. The essential difference in the device illustrated in Figure 2 from that of Figure 1 is that a material-holding device, illustrated at 60, is disposed adjacent to the tape 24, and the radiation measuring means which includes the Geiger-Mueller counters 28 and 30, the shields 32 and 34, and the differential counting rate meter 58 and recorder 60 have been omitted.

As a result of this construction, particles and radiations emanating from the continuous wire or tape 24 as it emerges from exposure within the chain reactor 1 bombard any material held by the holder 60. As has been explained above, the intensity of these radiations may be accurately controlled by regulating the rate by which the endless wire or tape 24 is translated along its path.

It will of course be understood that the teachings of the invention are not limited to the embodiments illustrated in the drawings and described above. Obviously the transmutable material need not be in the form of a tape or wire, but may be in many other forms, such as the perimeter of a wheel or other equivalents.

It will also be seen that some of the elements of the invention are well adapted for the bombardment of materials with nuclear particles and radiations for purposes other than measurement. As illustrated, the Geiger counter 28 is exposed to the continuous radioactivity of the tape 24; however, it may readily be seen that test specimens or even substantial quantities of materials which are sought to be subjected to radioactive bombardment may be placed adjacent the tape 24 in addition to, or in substitution for, the measuring device illustrated. Although silver is the best tape material for purposes of measurement, it may be desirable to select other tape materials for purposes of nuclear particle bombardment of materials in order to obtain desired particle and energy characteristics in the radioactivity of the tape 24. Intensity of the bombardment may, of course, be adjusted either by adjustment of the level of operation of the reactor 1 or by adjustment of the speed of the tape.

Other and less obvious applications of the teachings of the invention will readily occur to persons skilled in the art.

What is claimed is:

1. Apparatus for measurement of neutron flux comprising, in combination, an elongated endless tape of silver, a system of pulleys upon which said endless tape is strung, said pulley system extending from the region of said neutron flux to a region remote from said region of neutral flux, the portion of said pulley system which is remote from the region of neutron flux bearing the major portion of said elongated tape, driving means for continuously circulating said tape around the pulley system, radioactivity detecting means adjacent the portion of the tape approaching said region of neutron flux, radioactivity detecting means adjacent the portion of the tape leaving said region of neutron flux, and differential metering means coupled to both of said detecting means.

2. Apparatus for measurement of neutron flux comprising, in combination, an elongated endless mass of a solid material rendered radioactive by exposure to neutrons, guide means defining an endless path for said endless mass from the region of the neutron flux to a region remote from said region of neutron flux, the major portion of said mass being remote from the region of neutron flux, driving means for continuously circulating said mass around said path, radioactivity detecting means adjacent the portion of the mass approaching said region of neutron flux, radio-activity detecting means adjacent the portion of the mass leaving said region of neutron flux, and differential metering means coupled to both of said detecting means.

3. Apparatus for measurement of neutron flux comprising, in combination, an elongated endless mass of a solid material rendered radioactive by exposure to neutrons, guide means defining a path for said endless mass from the region of the neutron flux to a region remote from said neutron flux, the length of the path of said mass that is remote from the region of neutron flux being greater compared with the length of the path within said region of neutron flux, driving means for continuously circulating said mass around said path, and radioactivity measuring means adjacent the portion of the mass leaving said region of neutron flux.

4. Apparatus for bombardment of materials with nuclear particles and radiations comprising, in combination, a source of neutrons, an endless tape of a material rendered radioactive by neutrons, a pulley system extending from a region remote from the source of neutrons to a region contiguous to the source of neutrons, the tape being strung upon the pulley system, the greater portion of the tape being remote from the neutron source, driving means coupled to the pulley system for continuously circulating the tape around the pulley system, and means for holding the material to be bombarded adjacent to the tape at a point remote from the source of neutrons.

5. A method of bombarding materials with nuclear particles and radiations comprising the steps of circulating an endless mass of a solid material rendered radioactive by exposure of neutrons between a region of neutron flux and a region substantially free from neutron flux, said material transmuting under neutron bombardment to elements having relatively short half-lives, and exposing the material to be bombarded to the radioactivity of the endless mass at a point remote from the region of neutron flux.

6. The method of claim 5 wherein each portion of the endless mass is retained in the region remote from the region substantially free of neutron flux for a length of time which is long compared to the time during which it is in the region of the neutron flux.

7. Apparatus for continuously measuring the flux density of nuclear particles and radiations in a region traversed by such particles and radiations as a function of time, said apparatus comprising, in combination, an endless mass of a solid substance which is rendered radioactive by exposure to said particles and radiations, means for continuously transporting said mass through said region at a constant rate in such a manner as to continuously change the portions of said mass exposed to said particles and radiations, means for continuously measuring the radioactivity of said portions upon emerging from said region, and means for continuously measuring the radio-activity of said portions upon re-entering said region.

8. Apparatus for bombardment of materials with nuclear particles and radiations comprising, in combination, a source of neutrons, an endless elongated mass of a solid material rendered radioactive by neutrons, said material transmuting under neutron bombardment to elements having relatively short half lives, means for continuously circulating said endless mass from a region contiguous to the source of neutrons to a region remote from the source of neutrons, and means for holding the material to be bombarded adjacent to the endless elongated mass at a point remote from the source of neutrons.

9. Apparatus for bombardment of materials with nuclear particles and radiations comprising the elements of claim 8 wherein the solid material consists of silver.

10. Apparatus for bombardment of materials with nuclear particles and radiations comprising, in combination, a source of neutrons, an endless elongated mass of material rendered radioactive by neutrons, means for continuously circulating said endless mass between a region contiguous to the neutron source and a region remote from the neutron source, said circulating means including a storage portion remote from the neutron source, the greater portion of said endless mass being contained in the storage portion of the circulating means, so that the radioactivity of a portion of the mass induced when such portion is adjacent to the neutron source decays before such portion again approaches the neutron source, and means for holding the material to be bombarded adjacent to the endless elongated mass at a point remote from the neutron source.

11. Apparatus for the measurement of neutron flux comprising, in combination, an elongated endless mass of a solid material rendered radioactive by exposure to neutrons, guide means defining a path for said endless mass from the region of the neutron flux to a region substantially free from neutron flux, driving means for continuously circulating said mass around said path, and radioactivity measuring means disposed adjacent to the mass at a point remote from the region of neutron flux.

12. Apparatus for continuously measuring the flux density of nuclear particles and radiations in a region traversed by said particles and radiations as a function of time, said apparatus comprising, in combination, a mass of a solid substance which is rendered radioactive by exposure to particles and radiations, said substance transmuting under particle and radiation bombardment to elements having relatively short half-lives, means disposed exterior to the region traversed by particles and radiations for measuring the radioactivity induced in said solid substance, and means for circulating said mass at a uniform rate through the region traversed by particles and radiations and past the means for measuring the radioactivity induced in the solid substance.

13. Apparatus for measuring neutron flux density in a region traversed by neutrons as a function of time comprising, in combination, an elongated tape containing a material which is rendered radioactive by exposure to neutron flux, said substance transmuting under neutron bombardment to elements having relatively short half-lives and said tape being substantially unaffected by other nuclear particles and radiations, means for continuously circulating said tape through a region traversed by neutrons, said means circulating said mass at a constant velocity, and means for measuring the radioactivity induced in the tape.

14. The apparatus of claim 13 wherein the tape includes silver.

(References on following page)

References Cited in the file of this patent

UNITED STATES PATENTS

| | | |
|---|---|---|
| 2,206,634 | Fermi et al. | July 2, 1940 |
| 2,482,813 | Urbach | Sept. 27, 1949 |
| 2,585,649 | Hanson | Feb. 12, 1952 |

FOREIGN PATENTS

| | | |
|---|---|---|
| 861,390 | France | Feb. 7, 1941 |
| 233,011 | Switzerland | Oct. 2, 1944 |

OTHER REFERENCES

Smyth: "Atomic Energy for Military Purposes" (Aug. 1945).

Goodman: "The Science and Engineering of Nuclear Power," vol. 1, pages 255–256, Addison-Wesley Press, Inc. (1947).

Goodman: "The Science and Engineering of Nuclear Power," vol. 1, page 230, Addison-Wesley Press, Inc. (1947).

Science, vol. 105, No. 2723, pages 265–267 (Mar. 7, 1947).